(12) United States Patent
Sasaki

(10) Patent No.: US 7,706,011 B2
(45) Date of Patent: Apr. 27, 2010

(54) IMAGE SENSING APPARATUS AND CONTROL METHOD THEREFOR

(75) Inventor: Futoshi Sasaki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 992 days.

(21) Appl. No.: 11/449,685

(22) Filed: Jun. 9, 2006

(65) Prior Publication Data
US 2006/0279636 A1    Dec. 14, 2006

(30) Foreign Application Priority Data
Jun. 9, 2005    (JP)    ............... 2005-170050

(51) Int. Cl.
*G06K 9/36* (2006.01)
*H04N 1/04* (2006.01)
*G06F 15/00* (2006.01)

(52) U.S. Cl. .................. 358/1.15; 358/474; 382/232

(58) Field of Classification Search ............ 382/166, 382/232, 244, 312; 358/474, 475, 401, 1.15, 358/1.13, 1.14, 1.1, 1.16, 1.6, 426.08, 426.05, 358/426.11, 443
See application file for complete search history.

(56) References Cited

U.S. PATENT DOCUMENTS

| | | | | |
|---|---|---|---|---|
| 6,424,385 B1 * | 7/2002 | Koyama et al. | ............. | 348/734 |
| 6,480,297 B1 * | 11/2002 | Suzuki et al. | ............. | 358/1.16 |
| 6,952,222 B2 * | 10/2005 | Sekine | ............. | 348/207.2 |
| 7,515,285 B2 * | 4/2009 | Watanabe | ............. | 358/1.13 |
| 7,522,196 B2 * | 4/2009 | Oyama | ............. | 348/231.99 |
| 7,545,527 B2 * | 6/2009 | Matsuhara et al. | ............. | 358/1.15 |
| 7,561,184 B2 * | 7/2009 | Shintani | ............. | 348/207.99 |
| 7,565,073 B2 * | 7/2009 | Kameyama et al. | ............. | 396/123 |

FOREIGN PATENT DOCUMENTS

JP    2005/33468    3/2005

OTHER PUBLICATIONS

ISO/IEC 10918-1:1994/Cor.1:2005(E), Information Technology—Digital Compression and Coding of Continuous-Tone Still Images- Published Feb. 15, 2005.
ISO/IEC 15444-1:2000(E), Information Technology—JPEG 2000 Image Coding System-Published Dec. 15, 2000.

* cited by examiner

*Primary Examiner*—Jerome Grant, II
(74) *Attorney, Agent, or Firm*—Fitzpatrick, Cella, Harper & Scinto

(57) ABSTRACT

An image sensing apparatus, such as a digital camera, directly communicates with a printer so that a printer with a photo-direct printing function normally prints a file containing raw and encoded image data. When the digital camera side selects a file containing raw and JPEG images, and the printer has a raw image printing function, the selected image file is directly output. When the file containing the raw and JPEG images is selected, and the printer does not have the raw image printing function, it is decided whether the size of the selected image file exceeds the upper limit size acceptable to the printer. If the file size exceeds the upper limit size, the raw image data is removed to reduce the file size, and the obtained data is transmitted to the printer. When an upper limit is not set, the selected image file is directly transmitted.

7 Claims, 8 Drawing Sheets

FIG. 5

| RECORDING MODE | IMAGE SIZE |
| --- | --- |
| ISD MODE (L) | RAW : 3456×2304 PIXELS<br>JPEG : 3456×2304 PIXELS |
| ISD MODE (S) | RAW : 3456×2304 PIXELS<br>JPEG : 1728×1152 PIXELS |
| JPEG MODE (L) | JPEG : 3456×2304 PIXELS |
| JPEG MODE (M) | JPEG : 2496×1664 PIXELS |
| JPEG MODE (S) | JPEG : 1728×1152 PIXELS |

ISD (JPEG+RAW)

JPEG IMAGE

RAW IMAGE

FIG. 7

| PRINTER MODEL NAME | RAW | FILE SIZE LIMITATION | FILE SIZE LIMITATION | RESOLUTION IN STANDARD QUALITY PRINTING | RESOLUTION IN HIGH QUALITY PRINTING |
|---|---|---|---|---|---|
| PR1000 | YES | NO | NO | 300dpi | 600dpi |
| PR2000 | YES | NO | NO | 600dpi | 600dpi |
| : | : | : | : | : | : |
| PR-X10 | NO | 4MB | 4MB | 300dpi | 300dpi |
| AAAA | NO | 6MB | 6MB | 300dpi | 300dpi |

FIG. 8

PR1000 TABLE FOR EXPLAINING NUMBER OF PIXELS

| PAPER SIZE \ PRINT QUALITY | STANDARD QUALITY | | HIGH QUALITY | |
|---|---|---|---|---|
| L | 1576 | 1104 | 3152 | 2208 |
| Postcard | 1824 | 1240 | 3648 | 2480 |
| 2L | 2200 | 1456 | 4400 | 2912 |
| A4 | 3600 | 2400 | 7200 | 4800 |

# IMAGE SENSING APPARATUS AND CONTROL METHOD THEREFOR

FIELD OF THE INVENTION

The present invention relates to an image sensing apparatus such as a digital camera, and a control method therefor.

BACKGROUND OF THE INVENTION

In recent years, the popularity of digital cameras has increased rapidly. The main factor in this phenomenon may be attributed to the processing of a photographed image as digital data, permitting the easy storage, management, and erasure by the digital camera of the photographed image, unlike a conventional film camera.

When an image photographed by such a digital camera is to be printed and used as a photograph, it is a common practice to temporarily load the photographed digital image data to a PC (computer) by some means, and output the loaded digital image data to a printing apparatus connected to the PC and print it by using an application running on the PC. Note that as a means for loading the image from the digital camera to the PC, one of the following forms is in the mainstream: a form of connecting the digital camera and the PC via a USB interface cable to communicate with each other; and a form of extracting a memory card (a storage medium in which the sensed digital image data is stored) from the digital camera, and setting the memory card to a card reader of the PC to read the digital image data.

Recently, a so-called photo-direct (PD) technique has been developed, such as a technique (e.g., Japanese Patent Laid-Open No. 2005-33468) in which a digital camera is directly connected to a printing apparatus without the mediacy of a PC to directly transmit digital image data from the digital camera to the printing apparatus, and to print, and a technique in which a memory card reader slot is formed in the printing apparatus to set a memory card, which has been extracted from the digital camera, and to print.

More specifically, in order to directly transmit the image data from the digital camera to the printing apparatus to print, the camera generally transmits image data containing not only a JPEG image but also photographing information, such as a photographing date and photographing condition. This allows the printing apparatus to appropriately perform an image process based on the photographing information, and print. Note that an Exif format or the like is defined as a file format in which a JPEG image file contains such photographing information.

Note that JPEG which is an image compression technique used in the digital camera is one of lossy encoding techniques. In JPEG, the compression ratio can be increased by removing components which are hardly visually recognized from pieces of information in the image data (called raw image data) sensed by the image sensing device.

Some users perform advanced image editing on the PCs to obtain high value-added images. Such users strongly want to edit the raw image data instead of the JPEG image data. To meet this demand, recently, a digital camera has been available on the market, which can be set to a mode wherein raw and JPEG image data are stored as one file in storing the photographed image data as a file in the memory card.

However, the raw image data contains the information of the image data sensed by the image sensing device, and has a large information amount. Consequently, the image file containing both the raw and JPEG image data has a larger information amount. This poses a problem that some printing apparatuses cannot handle such large image data files because of an internal memory capacity limitation.

Also, a printing apparatus has been developed which can achieve high-quality printing in a format in which image data contains raw image data and photographing information. However, it is redundant to transfer a file containing raw and JPEG image data to such printing apparatus.

SUMMARY OF THE INVENTION

The present invention has been made in consideration of the above problem, and has as its object to provide a technique of guaranteeing that an image sensing apparatus, capable of directly communicating with a printing apparatus, causes a printing apparatus with a photo-direct printing function to normally print a sensed image file even when the sensed image file contains raw image data and encoded image data such as a JPEG image obtained in a versatile encoding process.

In order to solve the problem, for example, the image sensing apparatus of the present invention has the following structure. That is, the present invention includes an image sensing apparatus which includes image sensing unit, develops at least image data sensed by the image sensing unit, compression-encodes the developed image data in a predetermined encoding process, and has a first recording mode in which the compression-encoded image data is recorded as a file in a recording medium, and a second recording mode in which raw image data obtained without a developing process for the image data sensed by the image sensing unit, and compression-encoded image data obtained in the encoding process are recorded as one file. The apparatus comprises:

a communication unit configured to directly communicate with an external printing apparatus, a designation unit configured to designate a print target file from image files stored in the storage medium, a generation unit configured to generate, when the image file designated by the designation unit is a file recorded in the second recording mode, print data by removing the raw image data from the designated image file, and a transmission unit configured to transmit the generated data to the printing apparatus via the communication unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing the recording mode of a digital camera 10 according to the embodiment;

FIG. 7 is a table showing an example of the table which is used to determine the function of a printing apparatus, and stored in a ROM 110 according to the embodiment; and FIG. 8 is a table showing an example of the number of pixels for printing.

DETAILED DESCRIPTION OF THE PREFERRED EMBODIMENTS

The embodiments of the present invention will be described in detail below with reference to the accompanying drawings.

First Embodiment

In the first embodiment, a "JPEG image" is an image obtained by developing digital image data obtained by A/D-converting an image signal sensed by an image sensing device, and then compression encoding the developed digital image data using a JPEG compression algorithm (reference document: ISO/IEC 10918-1: 1994). On the other hand, a "raw image" is an image obtained by compressing an A/D-converted image (in this stage, the precision for each color component is larger than 8 bits, e.g., 12 bits) using a lossless compression algorithm (such as a combination of DCPM (Differential PCM) and Huffman encoding) without performing development.

Figure 1:
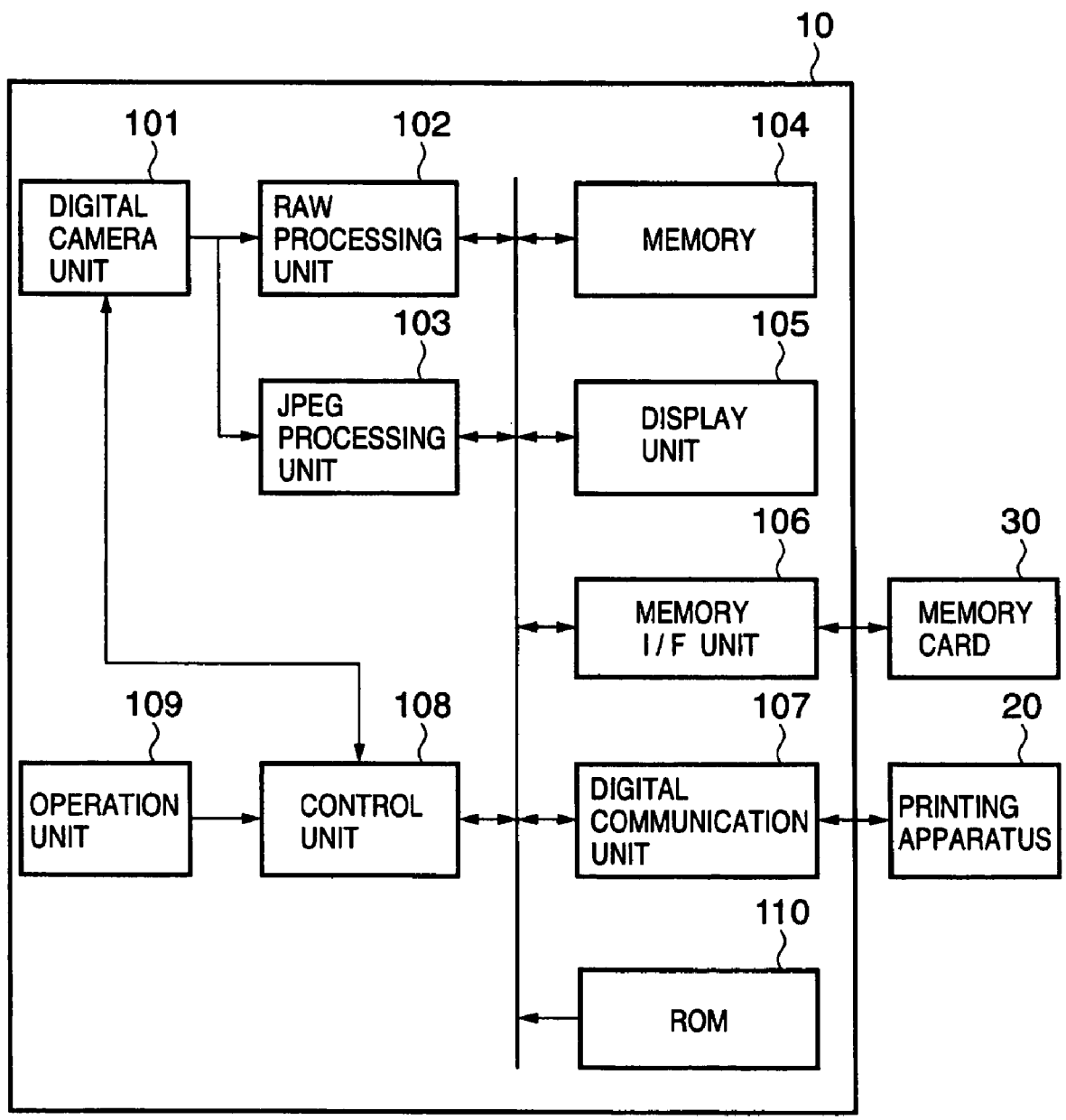
FIG. 1 is a block diagram of an image printing system according to an embodiment.

Referring to FIG. 1, an image printing system of the first embodiment will be described.

The image printing system in FIG. 1 includes a digital camera 10 serving as an example of an image sensing apparatus, a printing apparatus 20, and a memory card 30 which is detachable and serves as an example of a random-accessible recording medium.

The digital camera 10 can directly communicate with the printing apparatus 20 via a communication cable such as a USB cable or wireless communication. The digital camera 10 may have a function of photographing a moving image with audio and recording it in the memory card 30, in addition to a function of photographing a still image and recording it in the memory card 30. The printing apparatus 20 has a photo-direct printing function, and serves as an apparatus which can print only a JPEG image and not a raw image, or both the JPEG and raw images.

The digital camera 10 includes a digital camera unit 101 with a function of photographing a digital image of an object using an image sensing device (CCD sensor, CMOS sensor, and the like), a raw processing unit 102 with a function of generating a raw image and its accessory information (containing, e.g., a thumbnail image and information representing a recording mode type) from the photographed image, a JPEG processing unit 103 with a function of generating a JPEG image and its accessory information (containing, e.g., a thumbnail image and information representing a recording mode type) from the photographed image, a memory 104 used as a work area, a display unit 105 which comprises a liquid crystal display, a memory interface unit 106 with a function of accessing the memory card 30, a digital communication unit 107 used to directly communicate with the printing apparatus 20, a control unit 108 which controls various processes executed by the digital camera 10, an operation unit 109 which inputs a user instruction to the control unit 108, and a ROM 110 which stores various data and firmware (program) as the processing procedure of the control unit 108.

For example, the digital camera 10 has recording modes shown in FIG. 5. The recording mode is selected by the operation unit 109.

A JPEG mode (L) is a recording mode in which a large-sized JPEG image (image size: 3,456×2,304 pixels) is generated from the photographed image, and the generated JPEG image is recorded in the memory card 30.

A JPEG mode (M) is a recording mode in which a medium-sized JPEG image (image size: 2,496×1,664 pixels) is generated from the photographed image, and the generated JPEG image is recorded in the memory card 30.

Figure 6A:
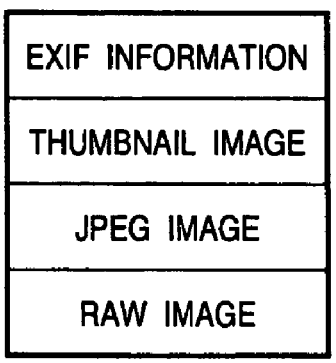
FIGS. 6A to 6C are tables showing examples of the structures of an ISD image file, JPEG image file, and raw image file according to the embodiment.
Figure 6B:
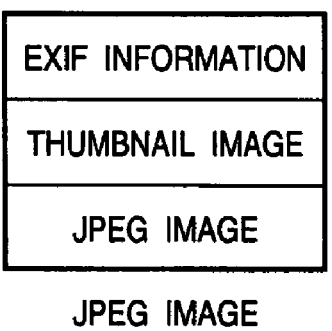

A JPEG mode (S) is a recording mode in which a small-sized JPEG image (image size: 1,728×1,152 pixels) is generated from the photographed image, and the generated JPEG image is recorded in the memory card 30. In each JPEG mode, a file having a structure shown in FIG. 6B is created.

An ISD mode (L) is a recording mode in which a raw image (image size: 3,456×2,304 pixels) and a large-sized JPEG image (image size: 3,456×2,304 pixels) are generated as one image file from the photographed image, and the generated image file is recorded in the memory card 30.

An ISD mode (S) is a recording mode in which a raw image (image size: 3,456×2,304 pixels) and a small-sized JPEG image (image size: 1,728×1,152 pixels) are generated as one image file from the photographed image, and the generated image file is recorded in the memory card 30. In each ISD mode, a file having a structure shown in FIG. 6A is created.

Figure 6C:
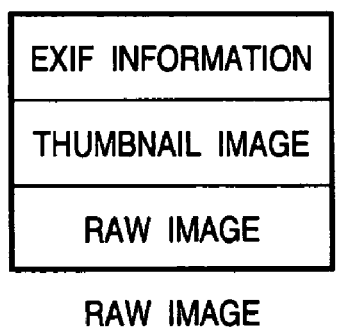

Although not shown, a file may contain only raw images (in the first embodiment, 3,456×2,304 pixels). The file containing only raw images has a file structure shown in FIG. 6C.

Figure 2:
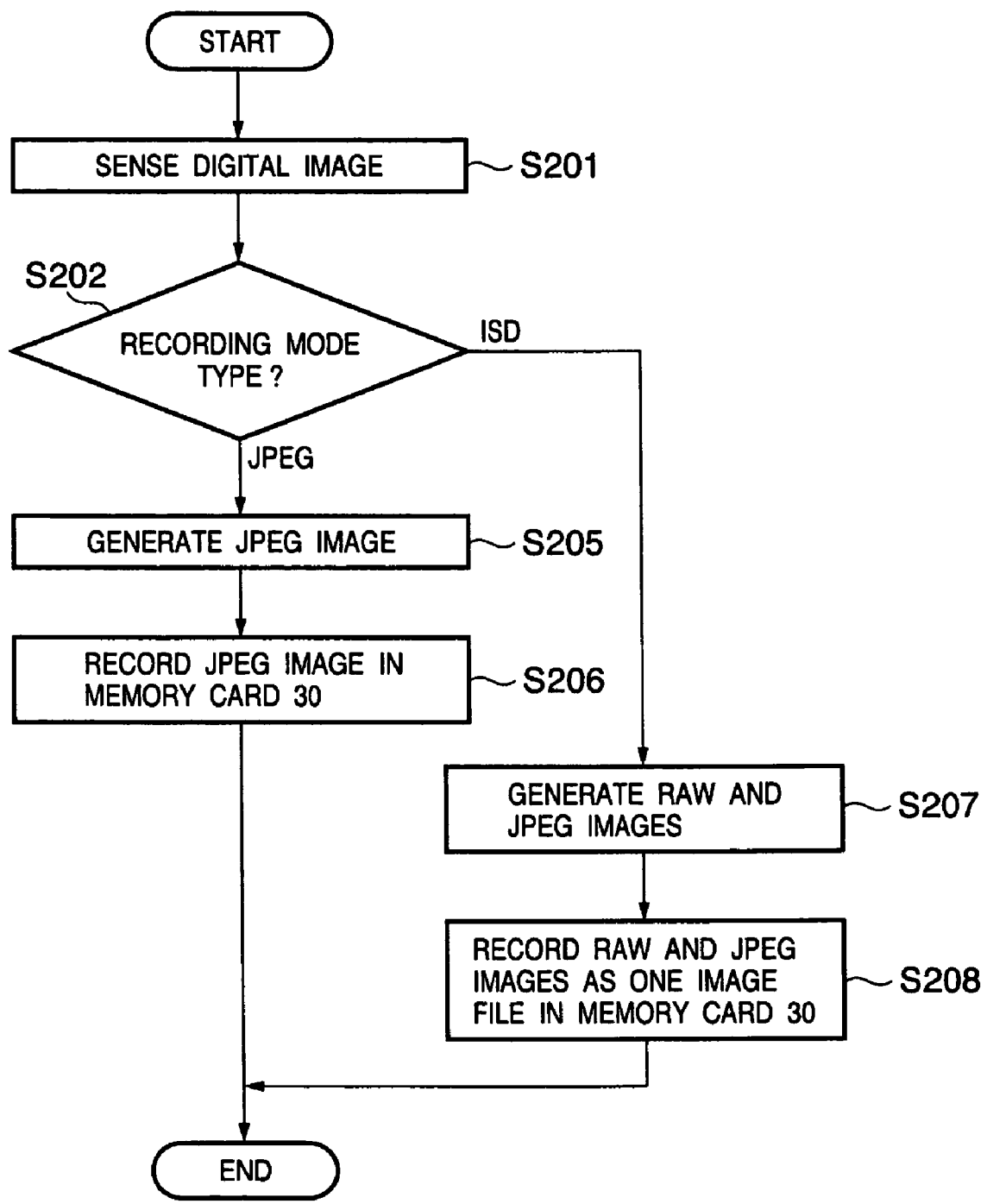
FIG. 2 is a flowchart showing a photographing process in a digital camera according to the embodiment.

Referring to FIG. 2, a photographing process executed by the digital camera 10 will be described next. The photographing process shown in FIG. 2 is executed by pressing a shutter button of the operation unit 109.

First, in step S201, the control unit 108 requests the digital camera unit 101 to start the photographing process. The digital camera unit 101 photographs a digital image of an object using an image sensing device or the like.

In step S202, the control unit 108 determines a current recording mode type. If the current recording mode is the JPEG mode (L), (M), or (S), the flow advances to step S205. If the current recording mode is the ISD mode (L) or (S), the flow advances to step S207.

In step S205, the control unit 108 requests the JPEG processing unit 103 to generate a JPEG image. The JPEG processing unit 103 generates a JPEG image and its accessory information from the photographed image, and writes the generated JPEG image and its accessory information in the memory 104. Note that before compression, the JPEG processing unit 103 adjusts the white balance, the gamma value, the contrast, the sharpness (edge enhancement), the color density, the tint, and the like of the photographed image. The JPEG processing unit 103 also changes the resolution (number of pixels) depending on the recording mode. The display unit 105 displays a thumbnail JPEG image on the liquid crystal display.

The flow advances to step S206, and the control unit 108 requests the memory interface unit 106 to write the JPEG image data and its accessory information from the memory 104. The memory interface unit 106 writes the JPEG image data and its accessory information as a file from the memory 104 to the memory card 30.

On the other hand, when it is determined in step S202 that the recording mode is the ISD mode, and the flow advances to step S207, the control unit 108 requests the raw processing unit 102 to generate the raw image, and requests the JPEG processing unit 103 to generate the JPEG image. The control unit 108 also designates the resolution and notifies the JPEG processing unit 103 of it.

The raw processing unit 102 generates the raw image and its accessory information from the photographed image, and writes the generated raw image and its accessory information in the memory 104. Note that before compression, the raw processing unit 102 does not adjust the white balance, the gamma value, the contrast, the sharpness (edge enhancement), the color density, the tint, and the like of the photographed image. The JPEG processing unit 103 generates a JPEG image and its accessory information from the photographed image, and writes the generated JPEG image and its accessory information in the memory 104. Note that before compression, the JPEG processing unit 103 adjusts the white balance, the gamma value, the contrast, the sharpness (edge enhancement), the color density, the tint, and the like of the photographed image. The display unit 105 displays the thumbnail raw image on the liquid crystal display.

Next, in step S208, the control unit 108 requests the memory interface unit 106 to record one image file containing the raw image data, the JPEG image data, and their pieces of accessory information written in the memory 104. The memory interface unit 106 writes the file containing the raw image, the JPEG image, and their pieces of accessory information from the memory 104 to the memory card 30.

Figure 3:
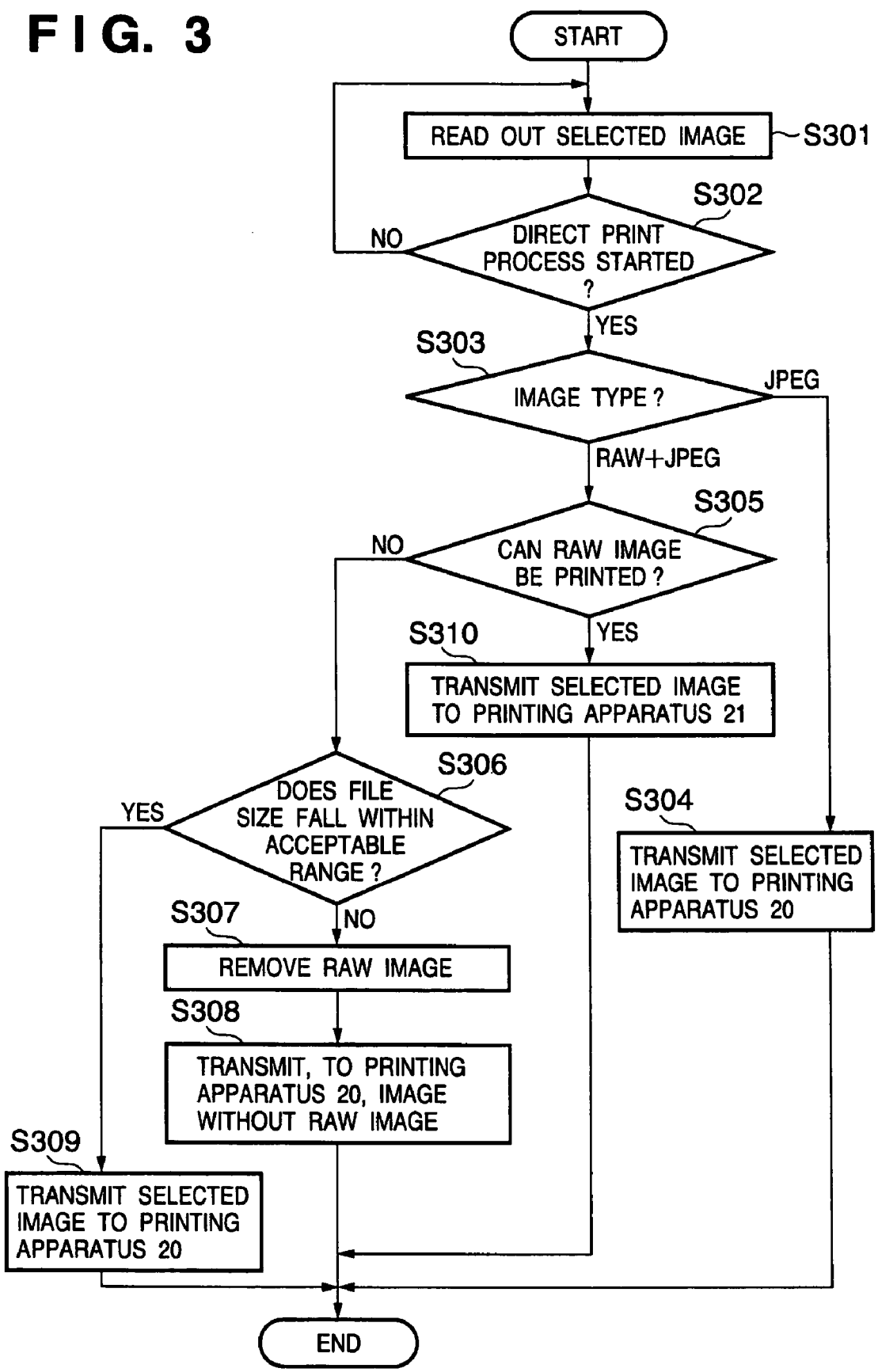
FIG. 3 is a flowchart showing a photo-direct printing process in a digital camera according to the first embodiment.

Referring to FIG. 3, a direct-print process executed in the image printing system in FIG. 1 will be described next.

The direct-print process shown in FIG. 3 is performed when the digital camera 10 can directly communicate with the printing apparatus 20 via a communication cable or wireless communication. Assume that in establishing direct communication between the digital camera 10 and the printing apparatus 20 (in shifting to the photo-direct mode), the digital camera 10 has already acquired capability information (function information) and the printing apparatus model name which are notified from the printing apparatus 20. A table as shown in FIG. 7 is stored in the ROM 110. This table stores the model name and print resolution of the printing apparatus which supports the raw mode, and the model name and memory limit amount (upper limit value) of the printing apparatus which prints a limited image file. These printing apparatuses are already available from manufacturers at the time of shipping the digital camera 10. It is decided that a printing apparatus which is not found in the table and can shift to the photo-direct printing mode can print the JPEG image data.

First, in step S301, the control unit 108 requests the memory interface unit 106 to display, on the display unit 105, the sensed image to be printed. The memory interface unit 106 reads the corresponding image and its accessory information from the memory card 30, and writes the readout image and its accessory information in the memory 104. The display unit 105 displays, on the liquid crystal display, the thumbnail image of the image written in the memory 104. A user instructs whether to print the displayed image, or input a next image display instruction using the operation unit 109. The image instructed to be subjected to the direct-print process is called as a selected image hereinafter. Upon issuing an instruction to perform the direct-print process, the user operates the operation unit 109 to select the printing paper size, print style (with or without a frame), and the number of print copies, and then instructs to start the direct-print process.

In step S302, the control unit 108 determines whether the user instructs to start the direct-print process. If it is determined that the user instructs to start the direct-print process, the flow advances to step S303.

In step S303, the control unit 108 discriminates whether the selected image recording mode is the ISD mode (L) or (S). If the selected image recording mode is the ISD mode (L) or (S), the flow advances to step S305. If the selected image recording mode is not the ISD mode (L) or (S), i.e., if the selected image recording mode is the JPEG mode (L), (M), or (S), the flow advances to step S304.

In step S304, the control unit 108 requests the digital communication unit 107 to start a process of directly transmitting the selected image (JPEG image) to the printing apparatus 20. The digital communication unit 107 directly transmits the selected image and its accessory information from the memory 104 to the printing apparatus 20. At this time, the digital communication unit 107 acquires printing auxiliary information (such as the printing paper size, the print style, and the number of print copies which are selected by the user) from the control unit 108 to directly transmit the acquired printing auxiliary information to the printing apparatus 20. The printing apparatus 20 prints the selected image in accordance with the printing auxiliary information. Note that the printing apparatus which supports the photo-direct printing process always supports a JPEG image print process. Hence, the process in step S304 is not a special process.

On the other hand, when the flow advances from step S303 to step S305, i.e., when the selected image file contains both the raw and JPEG image data, the control unit 108 determines whether the printing apparatus 20 can print the raw image. Upon establishing communication, this determination is performed based on information (model name) given by the printing apparatus.

When it is determined that the printing apparatus in communication with the camera 10 supports a raw image print process, the flow advances to step S310. When it is determined that the printing apparatus cannot print the raw image, the flow advances to step S306.

In step S310, the control unit 108 requests the digital communication unit 107 to start a process of directly transmitting the selected image to the printing apparatus 20. The digital communication unit 107 directly transmits the selected image and its accessory information from the memory 104 to the printing apparatus 20. At this time, the digital communication unit 107 acquires printing auxiliary information (such as the printing paper size, the print style, and the number of print copies selected by the user) from the control unit 108 to directly transmit the acquired printing auxiliary information to the printing apparatus 20. The printing apparatus 20 determines which of the JPEG and the raw images in the received ISD image file is optimal based on the printing condition and resolution, and then prints the optimal image. That is, the printing apparatus 20 determines which of the images is to be printed.

As a result, for example, when a raw image of 3,456×2,304 pixels and a JPEG image of 1,728×1,152 pixels are available, the printing apparatus freely and properly selects a suitable image. Therefore, an optimal image with high image quality can be printed without complicated control, such as switching the images depending on the printing the paper size, the layout, and the resolution on the camera side.

On the other hand, in step S306 (when the printing apparatus 20 cannot print the raw image), the control unit 108 compares the image file size capacity (upper limit value) of the printing apparatus 20 with the size of a file to be printed. If it is decided "upper limit value <file size", the flow advances to step S307. If it is decided that the file size is not limited or "upper limit value ≧file size", the flow advances to step S309.

In step S309, the control unit 108 requests the digital communication unit 107 to start a process of directly transmitting the selected image to the printing apparatus 20. The digital communication unit 107 directly transmits the selected image and its accessory information from the memory 104 to the printing apparatus 20. At this time, the digital communication unit 107 acquires printing auxiliary information (such as the printing paper size, the print style, and the number of print copies which are selected by the user) from the control unit 108 to directly transmit the acquired printing auxiliary information to the printing apparatus 20. The printing apparatus 20 prints the selected image in accordance with the printing auxiliary information.

Note that in step S309, the selected image (a file containing the raw and the JPEG images) is transmitted in order to cope with the case where the currently connected printer appears on the market after the digital camera of this embodiment, and the control unit 108 cannot determine, in step S305, whether this printer can print the raw image. The printing apparatus which supports only JPEG images ignores the raw image data portion, thus posing no problem.

In step S307, the control unit 108 removes the raw image, and regenerates a file containing the JPEG image and its accessory information.

As a result, even when the image file containing the raw image has a size of 8.3 MB (in this image file, the JPEG image has a size of 3.3 MB), and the file size capacity limitation of the printing apparatus 20 is 6 MB, the printing apparatus 20 can properly print.

Subsequently, in step S308, the control unit 108 requests the digital communication unit 107 to start a process of directly transmitting, to the printing apparatus 20, the JPEG file generated from the selected image. The digital communication unit 107 directly transmits the selected image and its accessory information from the memory 104 to the printing apparatus 20. At this time, the digital communication unit 107 acquires printing auxiliary information (such as the printing paper size, the print style, and the number of print copies which are selected by the user) from the control unit 108 to directly transmit the acquired printing auxiliary information to the printing apparatus 20. The printing apparatus 20 prints the selected image in accordance with the printing auxiliary information.

As described above, according to the first embodiment, even when an image which is sensed in the ISD mode (a mode in which an image file to be stored contains the raw and the JPEG images) is designated as a print target, printing can be performed in accordance with the user's desire by adaptively transmitting the JPEG image, the raw image, and the raw and JPEG images depending on the function and model name of the printing apparatus 20 in communication with the camera 10.

Second Embodiment

The second embodiment will be described below with reference to the flowchart shown in FIG. 4. The flowchart in FIG. 4 can be replaced with that in FIG. 3. An apparatus structure and an image file format are the same as those in the first embodiment, and the description thereof will be omitted.

Figure 4:
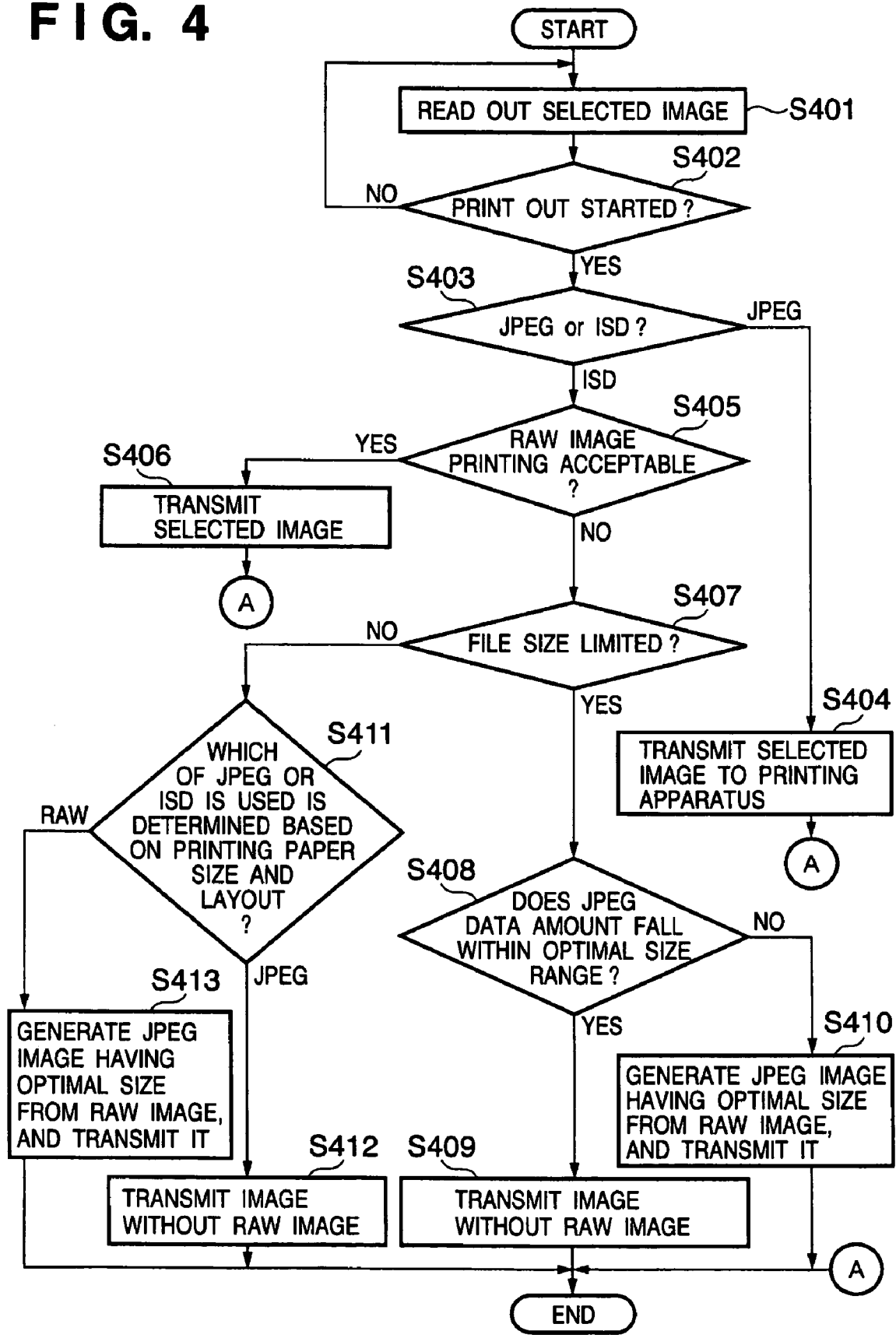
FIG. 4 is a flowchart showing a photo-direct printing process in a digital camera according to the second embodiment.

A direct-print process shown in FIG. 4 is executed after directly connecting a digital camera 10 to a printing apparatus 20 via a communication cable or wireless communication. Note that in establishing direct communication between the digital camera 10 and the printing apparatus 20 (in shifting to a photo-direct mode), the digital camera 10 acquires a model name notified from the printing apparatus 20.

First, in step S401, a control unit 108 requests a memory interface unit 106 to display, on a display unit 105, a sensed image to be printed. The memory interface unit 106 reads the corresponding image and its accessory information from a memory card 30, and writes the readout image and its accessory information in a memory 104. The display unit 105 displays, on a liquid crystal display, the thumbnail image of the image written in the memory 104. A user instructs the apparatus whether to print the displayed image, or input a next image display instruction using an operation unit 109. Upon issuing an instruction to perform the direct-print process, the user operates the operation unit 109 to select the printing paper size, the print style (with or without a frame), and the number of print copies, and then instructs to start the direct-print process.

In step S402, the control unit 108 determines whether the user instructs the apparatus to start the direct-print process. If the user instructs the apparatus to start the direct-print process, the flow advances to step S403.

In step S403, the control unit 108 discriminates whether the selected image recording mode is the ISD mode or the JPEG mode. If it is decided that the selected image recording mode is the JPEG mode, the flow advances to step S404. If it is decided that the selected image recording mode is the ISD mode, the flow advances to step S405.

In step S405, it is decided whether the printing apparatus in communication with the camera 10 can print the raw image. As described above, this decision is performed by searching a table in a ROM 110 using, as a key, the model name of the printing apparatus in communication with the camera 10. When the corresponding model name is registered, and the printing apparatus supports the printing of the raw image, it is decided that the printing apparatus can print the raw image. If it is decided that the printing apparatus can print the raw image, the flow advances to step S406 to transmit the selected image file (with accessory information) to the printing apparatus 20 in communication with the camera 10, and directly transmit printing auxiliary information to the printing apparatus 20.

If it is decided that the printing apparatus 20 in communication with the camera 10 cannot print the raw image, the flow advances to step S407 to decide whether the size of the file to be printed by the printing apparatus 20 is limited, with reference to the table stored in the ROM 110. If the model name is not found in the table, it is assumed that the file size is not limited.

If it is decided that the file size is limited, the flow advances to step S408 to decide whether the size of the JPEG image data in the selected image falls within the optimal size range decided depending on a file size limitation.

This optimal size range is obtained as follows.

Let P be the file size limitation which can be treated by the printing apparatus 20, and the range from P (inclusive) to P×α ($\alpha$ is a numerical value, e.g., "0.8" that meets $\alpha<0$) (inclusive) be the optimal size range. This definition is made to cope with the low resolution of the JPEG data in the ISD file, and/or the high compression ratio (low quality) by a large quantizing step in JPEG encoding. In other words, when the file size is the same as or close to the file size acceptable to the printing apparatus 20, the function of the printing apparatus 20 can be sufficiently exploited to realize high-quality printing. Note that the value $\alpha$ is merely an example, and may be replaced with another value or set by the user.

In step S408, when the data size of the JPEG image in the selected image falls within the optimal size range based on the file size limitation of the printing apparatus 20, the flow advances to step S409. In this step, data pertaining to the raw image is removed from the selected image to transmit the image data without the raw image data to the printing apparatus 20. At this time, the accessory information and the printing auxiliary information are also transmitted.

When the data size of the JPEG image in the selected image falls outside the optimal size range based on the file size limitation of the printing apparatus 20 in step S408, the flow advances to step S410.

The data size falls outside the optimal size range in the following two cases.

In the first case, the size of the JPEG image data in the selected image exceeds the file size limitation. In this case, an error occurs when the printing apparatus 20 is to print. Hence, small-sized JPEG image data must be generated.

In the second case, the size of the JPEG image data in the selected image is lower than the lower limit value of the optimal size range. In this case, the image quality desired by the user may not probably be obtained. Hence, it is desired to generate the JPEG data by removing a small amount of data, i.e., by a small quantizing step.

To meet this demand, in step S410, JPEG data is regenerated from the raw image data in the selected image such that the data size falls within the optimal size range. The generated JPEG image data, the above-described accessory information and printing auxiliary information are transmitted to the printing apparatus 20.

On the other hand, when the file size is not limited in the printing apparatus 20 in communication with the camera 10 (or when the model name is not found in the table in the ROM 110 although the printing apparatus has the photo-direct printing function) in step S407, the flow advances to step S411.

In step S411, it is determined which of the raw and the JPEG images of the selected image is printed, depending on the print resolution (calculated based on the table in FIG. 7, and the print quality information in the capability information) of the printing apparatus 20, the printing paper size, and the layout.

For example, when the selected image recording mode is the ISD mode (S), and a printing paper sheet has a size of A4 larger than an L size, the flow advances to step S413. In this step, the JPEG data is generated from the raw image data by the minimum quantizing step, thereby transmitting the generated JPEG image data, its accessory information, and the printing auxiliary information to the printing apparatus 20.

Even when the recording mode of the selected image is the ISD mode (S), if the printing paper sheet has a small size such as the L size, the control unit 108 removes the raw image from the selected image, regenerates the accessory information and the JPEG image file, and transmits the regenerated information and file to the printing apparatus in step S412.

Note that although the print resolution is not particularly mentioned, a prepared function is given by:

$$F(R0, S0, R1, Q)$$

where R0 is the print resolution of the printing apparatus, S0 is the printing paper size, R1 is the number of pixels of the JPEG image in the selected image, and Q is the quantization step of the selected image. According to this function, it may be decided whether to print the JPEG image in the selected image, or regenerate the JPEG image from the raw image. Alternatively, it may be decided that based on the table of FIG. 8 prepared in the ROM 110 in correspondence with the above function. Note that when the JPEG image is generated from the raw image (in step S413), the number of pixels (in horizontal and vertical directions) of the image data to be output to the printing apparatus 20 is the same as that of pixels acceptable to the image sensing device. However, the number of pixels of the image data may change to be sufficient in accordance with the printing paper size.

As described above, according to the second embodiment, a high image quality print output can be performed in addition to the operation/effect of the first embodiment.

Note that in the above-described embodiments, the present invention is applied to a digital camera. However, the present invention is not limited to this. As described above, the present invention may be applied to an apparatus which can store and hold image data, and transmit the image data to a printing apparatus to build a photo-direct printing system.

In the above-described embodiments, JPEG is exemplified as a technique of compression-encoding an image. However, another compression-encoding technique, e.g., the JPEG-2000 compression algorithm (reference: ISO/IEC 15444-1: 2000) to be a mainstream technique hereinafter may be used.

As described above, according to the present invention, in an image sensing apparatus capable of directly communicating with a printing apparatus, a printing apparatus with a photo-direct printing function can normally print even if a sensed image file contains raw image data and encoded image data such as a JPEG image obtained in a versatile encoding process.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-170050 filed on Jun. 9, 2005, which is hereby incorporated by reference herein in its entirety.

What is claimed is:

1. An image sensing apparatus for transmitting to an external printing apparatus an image file of image data sensed by an image sensing unit and recorded in a first recording mode in which compression-encoded, developed image data, which is developed by a developing process and is then compression-encoded in a predetermined encoding process, is recorded as a file in a storage medium, or a second recording mode in which raw image data obtained without a developing process for the image data sensed by the image sensing unit, and compression-encoded image data obtained in the encoding process are recorded as one file, wherein said image sensing apparatus comprises:
    a communication unit configured to directly communicate with the external printing apparatus;
    a designation unit configured to designate a print target file from image files stored in the storage medium;
    a generation unit configured to generate, when the image file designated by said designation unit is a file recorded in the second recording mode, print data by removing the raw image data from the designated image file;
    a transmission unit configured to transmit the generated data to the printing apparatus via said communication unit; and
    a determination unit configured to determine a model of the printing apparatus which communicates with said image sensing apparatus via said communication unit,
    wherein said generation unit generates, when said determination unit determines that the printing apparatus does not support raw image printing, data without the raw image data.

2. The apparatus according to claim 1, wherein when said determination unit determines that the printing apparatus in communication with said image sensing apparatus supports raw image printing, said transmission unit directly transmits the designated image file.

3. An image sensing apparatus for transmitting to an external printing apparatus an image file of image data sensed by an image sensing unit and recorded in a first recording mode in which compression-encoded, developed image data, which is developed by a developing process and is then compression-encoded in a predetermined encoding process, is recorded as a file in a storage medium, or a second recording mode in which raw image data obtained without a developing process for the image data sensed by the image sensing unit, and compression-encoded image data obtained in the encoding process are recorded as one file, wherein said image sensing apparatus comprises:

a communication unit configured to directly communicate with the external printing apparatus;

a designation unit configured to designate a print target file from image files stored in the storage medium;

a generation unit configured to generate, when the image file designated by said designation unit is a file recorded in the second recording mode, print data by removing the raw image data from the designated image file;

a transmission unit configured to transmit the generated data to the printing apparatus via said communication unit;

a determination unit configured to determine whether to set an upper limit size of a file to be printed by the printing apparatus in communication with said image sensing apparatus;

a decision unit configured to decide, when said determination unit determines that the upper limit size is set, whether a size of the compression-encoded image data in the file in the second recording mode falls within a recommended size range decided based on the upper limit size; and a regeneration unit configured to regenerate, when said decision unit decides that the compression-encoded imaged data falls outside the recommended size range, compression-encoded image data which falls within the recommended size range, from the raw image data of the image file of interest, wherein said transmission unit transmits the compression-encoded imaged data regenerated by said regeneration unit.

4. The apparatus according to claim 3, further comprising a selection unit configured to select, based on a printing condition, when said determination unit decides that the upper limit size of the file to be printed in the printing apparatus in communication with said image sensing apparatus is not set, whether to transmit the compression-encoded image data in the image file of interest, or regenerate the compression-encoded image data from the raw image data in the image file of interest and transmit the regenerated compression-encoded image data.

5. The apparatus according to claim 4, wherein the printing condition includes the print resolution of the printing apparatus, the printing paper size, the number of pixels of the compression-encoded imaged data in the image file of interest, and the data amount of the compression-encoded image data.

6. A control method for an image sensing apparatus which includes an image sensing unit and a communication unit configured to directly communicate with an external printing apparatus, the image sensing apparatus developing at least image data sensed by the image sensing unit, compression encoding the developed image data in a predetermined encoding process, and recording in a first recording mode in which the compression-encoded image data is recorded as a file in a storage medium, and a second recording mode in which raw image data obtained without a developing process for the image data sensed by the image sensing unit, and compression-encoded image data obtained in the encoding process are recorded as one file, said method comprising the steps of:

designating a print target file from image files stored in the storage medium;

generating, when the image file designated in the designation step is a file recorded in the second recording mode, print data by removing the raw image data from the designated image file;

transmitting the generated data to the printing apparatus via said communication unit; and determining a model of the printing apparatus which communicates with the image sensing apparatus via the communication unit, wherein the generating step generates, when the determination step determines that the printing apparatus does not support raw image printing, data without the raw image data.

7. A method for an image sensing apparatus for transmitting to an external printing apparatus an image file of image data sensed by an image sensing unit and recorded in a first recording mode in which compression-encoded, developed image data, which is developed by a developing process and is then compression-encoded in a predetermined encoding process, is recorded as a file in a storage medium, or a second recording mode in which raw image data obtained without a developing process for the image data sensed by the image sensing unit, and compression-encoded image data obtained in the encoding process are recorded as one file, wherein said method comprises:

causing the image sensing apparatus to directly communicate with the external printing apparatus;

designating a print target file from image files stored in the storage medium;

generating, when the image file designated by the designating step is a file recorded in the second recording mode, print data by removing the raw image data from the designated image file;

transmitting the generated data to the printing apparatus via the communicating step;

determining whether to set an upper limit size of a file to be printed by the printing apparatus in communication with the image sensing apparatus;

deciding, when said determining step determines that the upper limit size is set, whether a size of the compression-encoded image data in the file in the second recording mode falls within a recommended size range decided based on the upper limit size; and regenerating, when said deciding step decides that the compression-encoded imaged data falls outside the recommended size range, compression-encoded image data which falls within the recommended size range, from the raw image data of the image file of interest, wherein the transmitting step transmits the compression-encoded imaged data regenerated by the regenerating step.

* * * * *